United States Patent [19]

Ichiyanagi et al.

[11] 4,167,314
[45] Sep. 11, 1979

[54] MOTOR DRIVE UNIT FOR A CAMERA

[75] Inventors: Toshikazu Ichiyanagi, Tokyo; Tomonori Iwashita, both of Fuchu, both of Japan

[73] Assignee: Canon Kabushiki Kaisha, Tokyo, Japan

[21] Appl. No.: 726,189

[22] Filed: Sep. 24, 1976

[30] Foreign Application Priority Data

| Oct. 1, 1975 [JP] | Japan | 50/119138 |
|---|---|---|
| Dec. 16, 1975 [JP] | Japan | 50/149960 |
| Dec. 16, 1975 [JP] | Japan | 50/149961 |
| Dec. 16, 1975 [JP] | Japan | 50/149962 |
| Dec. 16, 1975 [JP] | Japan | 50/149963 |

[51] Int. Cl.² .................. G03B 1/00; G03B 17/00
[52] U.S. Cl. .................................... 354/173; 354/295
[58] Field of Search .............. 354/170, 171, 173, 204, 354/205, 212, 214, 288, 295, 354; 352/121, 137, 168, 169

[56] References Cited

U.S. PATENT DOCUMENTS

| 3,280,713 | 10/1966 | Goldberg | 354/173 X |
|---|---|---|---|
| 3,820,148 | 6/1974 | Osanai | 354/295 |
| 3,898,679 | 8/1975 | Ogiso et al. | 354/173 |
| 3,973,268 | 8/1976 | Arai | 354/173 |
| 4,006,489 | 2/1977 | Aizawa et al. | 354/173 |
| 4,015,198 | 3/1977 | Iwashita et al. | 354/29 |

Primary Examiner—L. T. Hix
Assistant Examiner—William B. Perkey
Attorney, Agent, or Firm—Toren, McGeady and Stanger

[57] ABSTRACT

In a motor drive unit for a camera, a body is provided with a camera attaching surface, a portion of which holds a dust shielding cover which receives a winding member of the camera. A set screw is adapted to mount the body onto the camera. A control drives a wind-up motor after each exposure of the camera.

8 Claims, 8 Drawing Figures

MOTOR DRIVE UNIT FOR A CAMERA

BACKGROUND OF THE INVENTION

1. Field of the Invention

This invention relates to motor drive units for use with photographic cameras, and more particularly to improvements in motor drive units having coordinating controls for a camera shutter and an electric motor.

2. Description of the Prior Art

The prior art provides motor drive units for photographic cameras having grips which accommodate the source of power or battery for the electric motor. In addition to the coupling mechanism between the motor drive unit and camera, therefore, there is a need to provide an additional coupling mechanism between the motor drive unit and the grip. The latter extends radially from the motor drive unit. This conventional engaging system leads to complexity in the construction and arrangement of the coupling elements and also to awkward bulkiness of the complete motor driven photographic instrument. What is worse is to move the battery casing in the direction along the length of the grip when an old battery is exchanged for a new one. This causes the operator difficulties in handling the instrument. This characteristic has prejudiced the usefulness of the camera with respect to portability and usefulness for snap photographs.

The prior art motor drive units have other drawbacks. For example, the motor-operating mechanical switch constituting part of the coordinating control system for the shutter and motor-driven film winding mechanisms of the camera must be arranged in the motor drive unit at a restricted location generally near a speed reduction gear train between the motor and the film take-up spool. This arrangement makes it difficult to achieve optimum distribution of the reduction gear train and the power supply control circuit for the motor with the limitation of the overall dimensions. As a result the process for fabricating the various elements of these parts in position with high accuracy cannot be performed economically.

Moreover, when the camera is assembled with the motor drive unit, the camera actuated by an actuator in the motor drive unit. Hence an operator is unable to ready himself for rapid change in attitude of the camera between two different angular positions, for example, lateral and vertical positions. Another problem resides in that the camera is provided with a dust-shielding cover removably received by a recess into which a coupler of the film take-up spool extends to engage a coupler of motor drive unit when unit and camera are assembled with each other. There is some possibility of missing the dust-shielding cover during the time the camera is operated with the motor drive unit because of the lack of the provision for accommodating the removed cover.

SUMMARY OF THE INVENTION

An object of the invention is to eliminate the above mentioned conventional drawbacks and to provide a motor drive unit for use with a photographic camera which unit includes coordinating control means with a selector switch arranged in the camera body so that the shutter release button provided in the camera functions not only to initiate operation of an exposure control apparatus of the camera but at the termination of an exposure to initiate operation of the motor driven film winding mechanism of the camera.

Another object of the invention is to provide a motor drive unit in which the motion transmitting means and the coordinating control means may be arranged separate from each other to establish optimum distribution of the various elements thereof and limit the overall dimensions to minimum.

Another object of the invention is to provide a motor drive unit with a battery casing easily attachable to and detachable from the housing of the unit so as to contribute, when attached thereto, to the compact structure of the complete motor-driven photographic camera.

Another object of the invention is to provide a motor drive unit having means for accommodating the dust-shielding disc when taken out of the camera.

Another object of the invention is to provide coordinating control means having an indicator positioned to be visible from the outside of the unit housing so that the operator is immediately aware if no more fresh film for a further exposure is available.

These and other objects and features of the present invention will be better understood upon reading the following detailed description taken in conjunction with the accompanying drawings in which:

DESCRIPTION OF THE PREFERRED EMBODIMENTS

Figure 1:
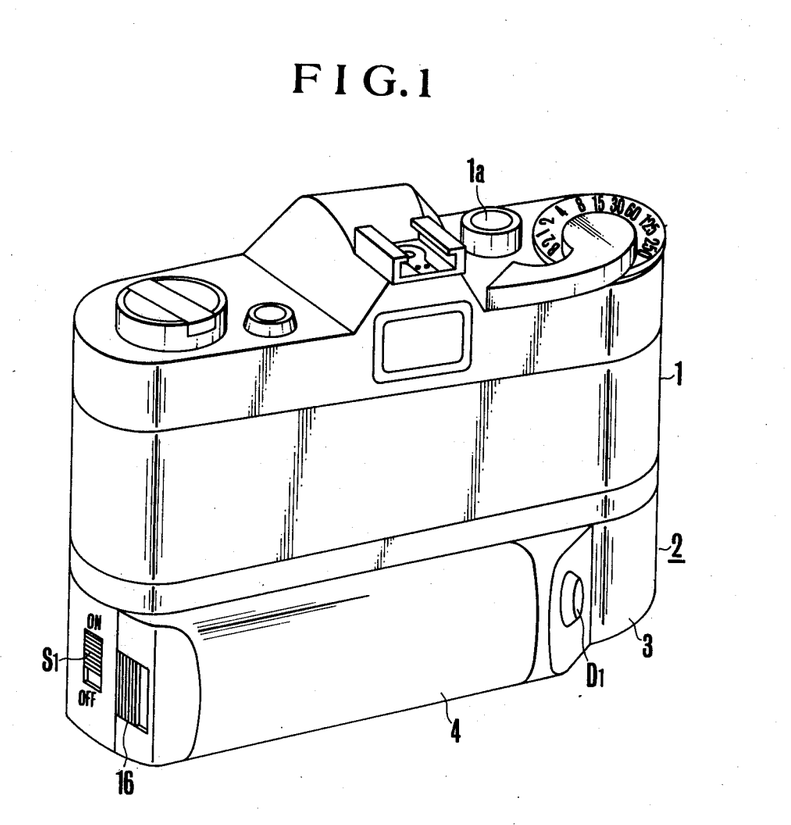
FIG. 1 is a perspective view of a motor drive unit embodying one form of the present invention attached to a single lens reflex camera.
Figure 2:
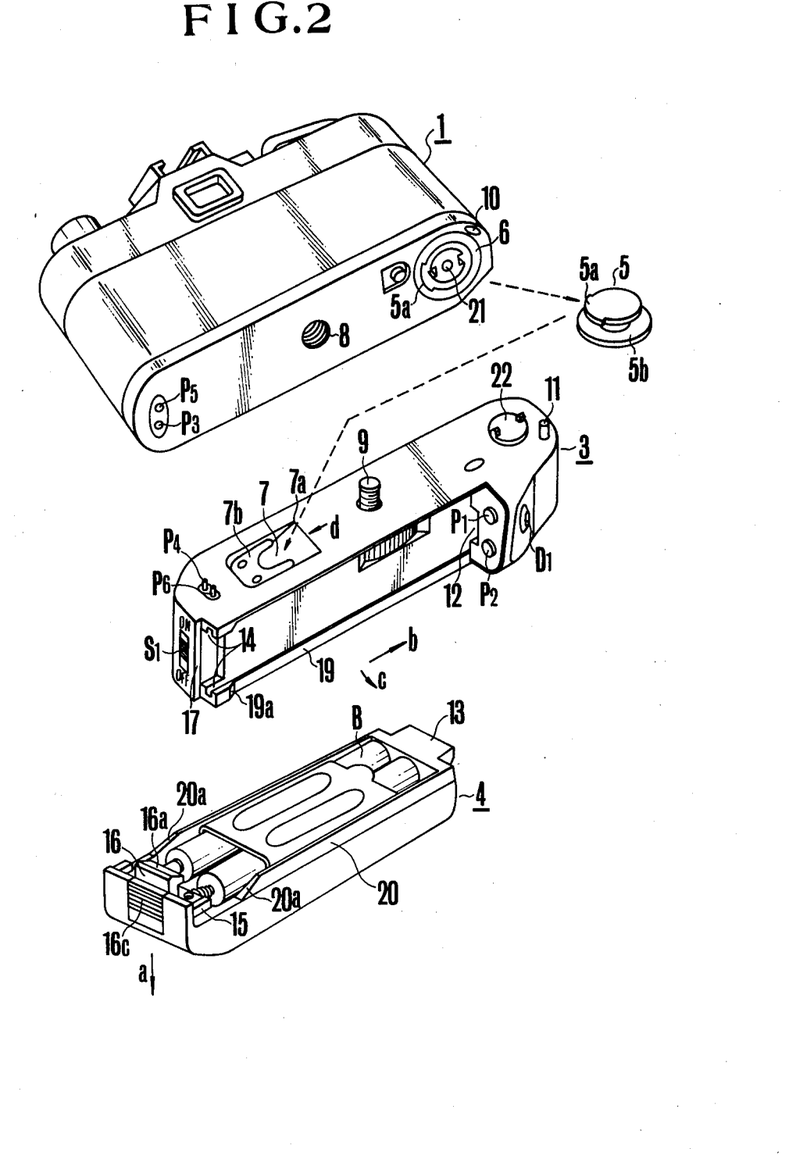
FIG. 2 is a perspective view of the motor drive unit of FIG. 1 with its body and battery holder being separated from each other and detached from the camera.
Figure 3:
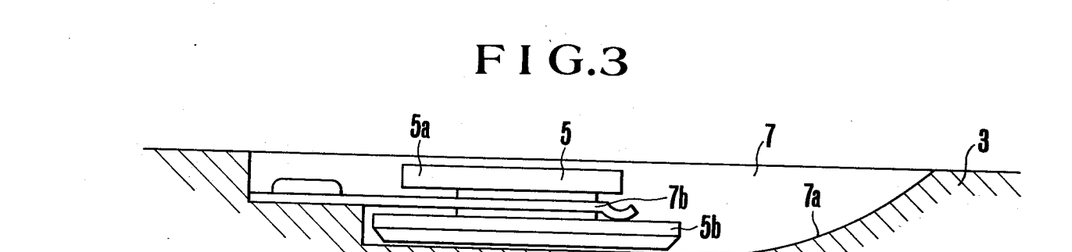
FIG. 3 is a sectional view of the provision for accommodating a dust-shielding disc 5 of FIG. 2 made at the top panel of the unit body housing.

One aspect of the present invention is shown in FIGS. 1, 2 and 3. In FIG. 1, a single lens reflex camera 1 having a shutter release button 1a is assembled with a motor drive unit 2 having a body 3 and a battery holder 4 attached to the body 3 in laterally disposed relation thereto. Thus a compact structure is realized for motor drive unit 2. In FIG. 2, camera 1, motor drive unit body 3 and battery holder 4 are shown separated from one another. Camera 1 is provided with a dust-shielding cover 5 for a recessed portion 6 of camera 1 in which a coupler 21 of the film take-up spool is positioned engage with a drive coupler 22 of motor drive unit 2 when they are assembled with each other. This cover 5 is constructed from a cam disc 5a of the same shape as that of the opening of recessed portion 6 provided in the bottom panel of the camera housing and an outer disc 5b fixedly connected through a shaft to the cam disc 5a. Outer disc 5b is dimensioned so that when cover 5 is inserted into recessed portion 6 by alignment of a projection of cam disc 5a with a cutout in a peripheral ring of recessed portion 6 and then turned about the shaft to some extent, a dust-tight shield is established at recessed portion 6 while cover 5 is fixedly secured thereto. The provision for accommodating cover 5 when taken out of camera 1 is made at a cutout 7 in the top panel of motor drive unit 2 as shown in FIGS. 2 and 3. Cutout 7 has a sliding surface 7a on which cover 5 with outer disc 5b facing downward may be moved in sliding engagement thereto in a direction indicated by arrow "d". At the end of forward sliding movement of cover 5, a forked plate spring 7b acts between cam disc 5a and outer disc 5b to urge the latter against a flat portion of the sliding surface 7a beyond a curved portion thereof, as shown in FIG. 3.

After cover 5 has been mounted in cutout 7, camera 1 may be brought into coupling engagement with motor drive unit 2, at first with its body 3 in such a manner that a female screw 8 provided in the bottom panel of camera 1 housing and which also serves to effect attachment of a tripod is aligned with a male screw 9 moveably extending from the top panel of the body 3 housing. A hole 10 of camera 1 aligns with a position-adjusting pin 11 extending from unit body 3, and a pair of electrical interconnection terminals P3 and P5 of camera 1 aligns with a pair of electrical interconnection terminals P4 and P6 of unit body 3 respectively. Upon alignment, the male screw 9 may be manually rotated until the motor drive unit body 3 is rigidly secured to camera 1. At this time, coupler elements 21 and 22 are also engaged automatically with each other to establish the motion transmission route to the film take-up spool.

Figure 4:
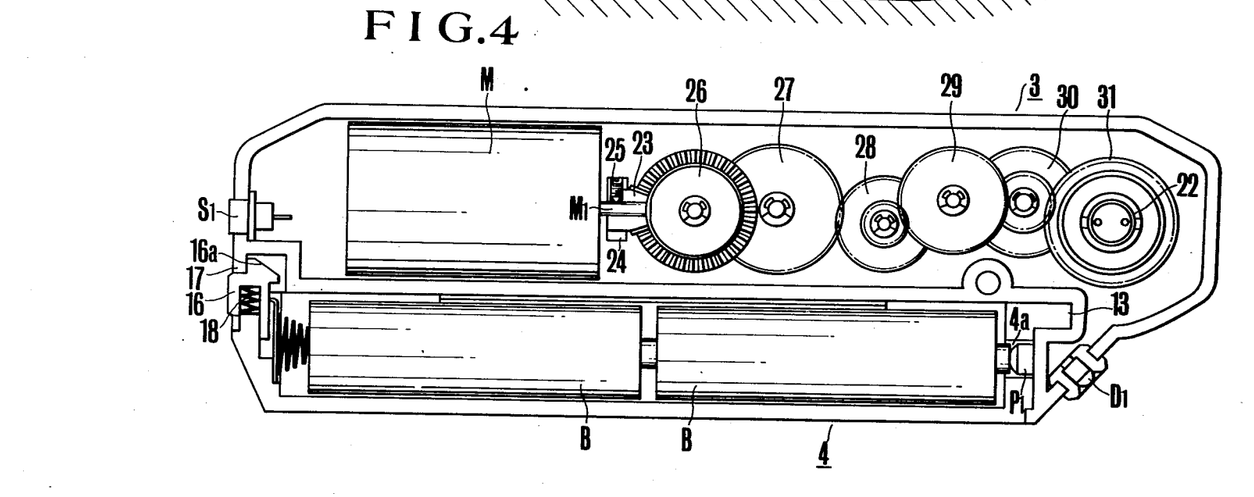
FIG. 4 is a horizontal sectional view showing a compact arrangement of a motor, a reduction gear train and batteries in the motor drive unit of FIGS. 1 and 2.

A coupling mechanism between motion drive unit body 3 and battery holder 4 is composed of a recessed portion 12 formed on one end side of a cutout of body 3, the opposite end of which has a pair of grooves 14. A pair of tapered surfaces 19 extend longitudinally on body 3 along the upper and lower edges of the cutout between the side having recessed portion 12 and a pair of backward projections having the respective grooves 14. A rectangularly shaped projection 13 extends from one end of a rectangular housing of the battery holder 4, the opposite end of which has a pair of guide rails 15 for sliding engagement with guide grooves 14. Holder 4 has a lock 16 with a pawl 16a and with a control knob 16c, and a pair of guide surfaces 20 tapered in the opposite sense to those of guide surfaces 19 which extend longitudinally along the upper and lower edges of the holder 4 housing on the front side thereof as viewed in FIG. 1. The lock pawl 16a is biased by a spring 18 (see FIG. 4) toward the front so that when the battery holder 4 is brought into coupling engagement with motor drive unit body 3 from a direction indicated by arrow "b" in alignment of projection 13 with recessed portion 12 while engaging and sliding the rails 15 and tapered surfaces 20 in and with grooves 14 and tapered surfaces 19 respectively, the lock pawl 16a is first moved backwards and then, after coupling, moved forwards to enter a recessed portion 17 provided in body 3 as shown in FIG. 4. Thus in order to conduct electric current from batteries B in holder 4 to an electric motor and a control circuit therefore in unit body 3, a pair of terminals P1 and P2 arranged on the same side as that having recessed portion 12 are provided for contact with a pair of terminals 4a (see FIG. 4) of holder 4 when unit body 3 and holder 4 are assembled together. Indicator D1 will be described in detail later.

To remove battery holder 4 from motor drive unit body 3 for battery-exchanging purpose, the control knob is displaced by the operator backwards or in a direction indicated by arrow "a" to disengage the lock pawl 16a from the edge of recessed portion 17. Next, holder 4 is displaced in the opposite direction to that indicated by arrow "b" so that guide rails 15 are at first disengaged from their respective grooves 14, and then projection 13 from recessed portion 12. Upon further displacement in the same direction, holder 4 moves away from unit body 3 in a direction perpendicular to direction "b" as the sloped end surface 20a of guide surfaces 20 ride on the respective sloped end surfaces of projection 19a.

Figure 5:
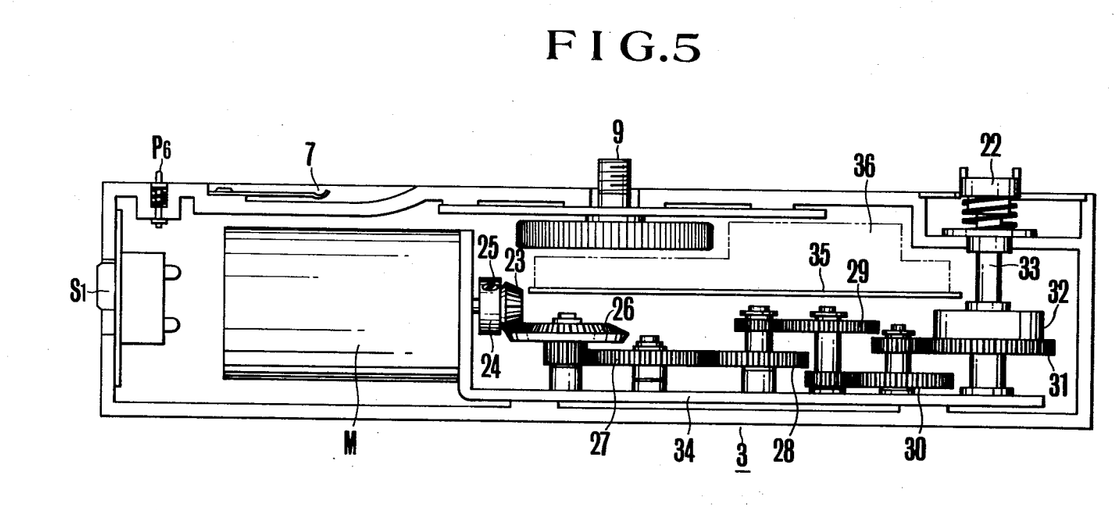
FIG. 5 is a vertical sectional view showing the location of the coordinating control circuit equipment relative to the motor and reduction gear train of FIG. 4.

Referring to FIGS. 4 and 5, the motor drive unit 2 includes an electric motor M, a reduction gear train 23, 26 to 33 to the coupler 22 and circuit means 36 for controlling the power supply for the motor M and for coordinating the motor and the camera shutter. The same reference characters have been employed to denote like parts to those shown in FIGS. 1 to 3. Motor M has an output shaft M1 on which a plastic bevel gear 23 is fixedly mounted through a metal ring 24 by a screw 25. The reduction gear train further includes a number of gears 26 to 31. Terminal one of bevel gear 26 meshes with bevel gear 23, and the opposite terminal one gear 31 is fixedly mounted on a one-way clutch 32, and is mounted on a common support plate 34 of motor M. Clutch 32 has a shaft 33 with frictional disc fixedly mounted at one end and the disc carries the coupler 22 through a compressed spring. A main switch S1 connected between the pair of terminals P1 and P2 and the positive bus of the control circuit means 36. Member 35 is a circuit printed plate.

Figure 6:
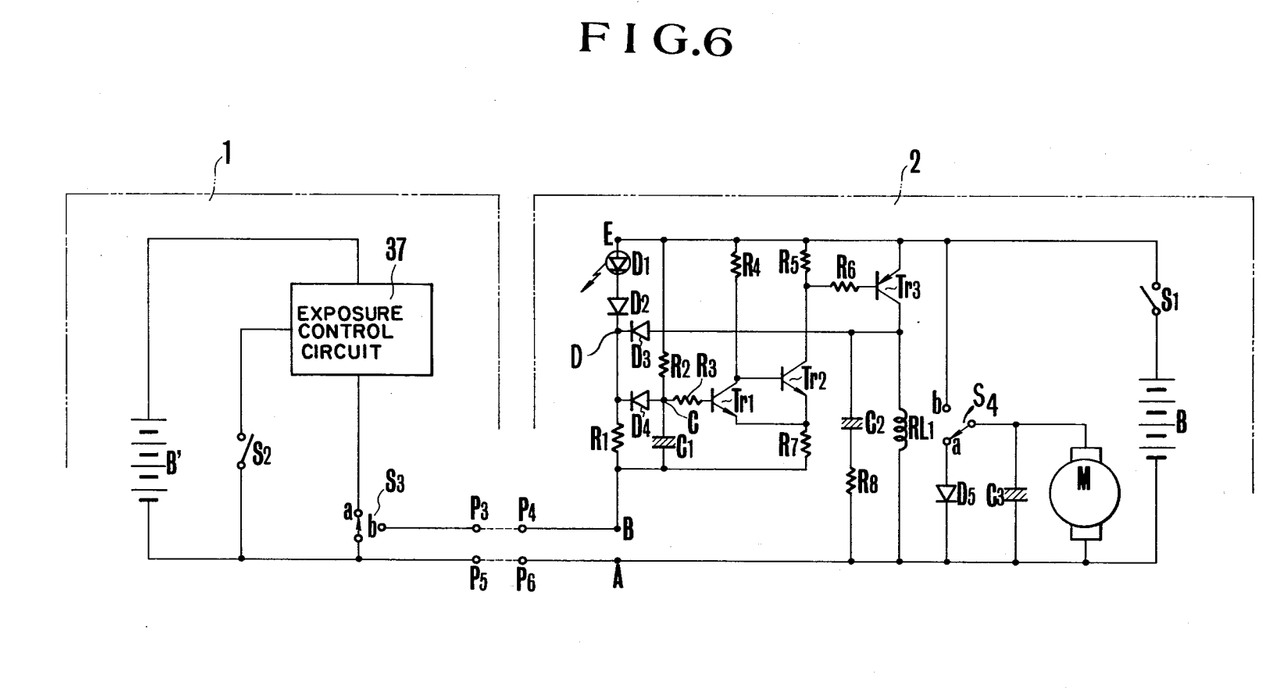
FIG. 6 is a circuit diagram of the motor drive unit and the camera of FIGS. 1 and 2.
Figure 7:
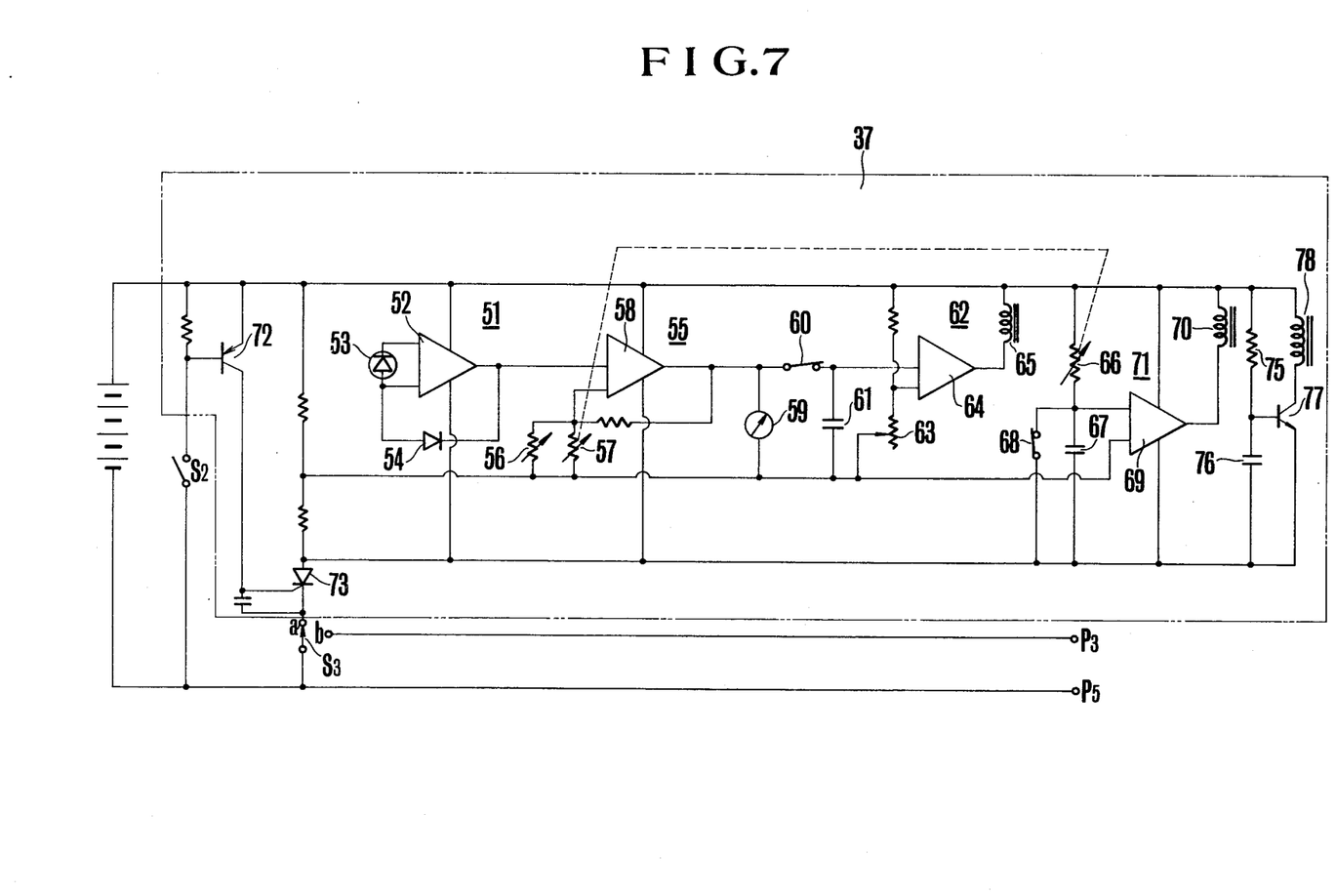
FIG. 7 is a circuit diagram showing the details of an exposure control circuit of FIG. 6.

FIG. 6 shows the details of the control circuit means 36 and also of the circuitry of camera 1, and FIG. 7 shows the details of an exposure control circuit 37 of FIG. 6. Referring first to FIG. 7, the exposure control circuit includes a sensor circuit 51, a diaphragm value computer 55, a diaphragm control circuit 62, a shutter control circuit 71, and a power supply control circuit connected between the source of an electrical energy or battery B' and a pair of buses, each of which will next be explained below.

The sensor circuit 51 is composed of a photosensitive element 53, an operational amplifier 52 having two input terminals between which element 53 is connected, and a log diode 54 connected to the feedback network of amplifier 52.

The diaphragm value computer 55 is composed of an operational amplifier 58 having two input terminals one of which is connected to the output terminal of the sensor circuit 51 and the other of which is connected to parallel-connected variable resistors 56 and 57 cooperative with a film speed setting dial and a shutter speed setting dial respectively. The output of amplifier 58 is applied to a diaphragm value indicator 59 and also to a storage capacitor 61 through a memory switch 60.

The diaphragm control circuit 62 is composed of an operational amplifier 64 having two input terminals, one of which is connected to one pole of the storage capacitor 61 and the other of which is connected to a variable resistor 63 cooperative with a diaphragm scanning mechanism not shown, and an electromagnet 65 responsive to the output of amplifier 64 for arresting the ever-moving diaphragm.

The shutter control circuit 71 is composed of an RC timing circuit composed of a variable resistor 66 mechanically linked with variable resistor 57 and a capacitor 67, an operational amplifier 69 having two input terminals one of which is connected to a point of connection between variable resistor 66 and capacitor 67, and the other of which is connected to the output terminal of a voltage divider, and an electromagnet 70 responsive to the output of amplifier 69 for controlling actuation of a rear shutter curtain. Connected across the timing capacitor 67 is a shutter start switch 68.

The power supply control circuit is composed of a thyristor 73 havng an anode connected to the negative bus of the aforementioned various circuit portions, a single pole-double throw switch S3 connected in series to thyristor 73 and to battery B', a switching transistor 72 with an emitter electrode connected to the positive bus and a collector electrode connected to a gate of thyristor 73, a capacitor 74 connected between the gate and cathode of thyristor 73, and a release switch S2 connected between the base electrode of transistor 72 and the negative bus. Switch S3 is arranged to switch from its "a" position to its "b" position when the rear shutter curtain runs down to terminate an exposure, and to switch from its "b" position to its "a" position when the shutter is cocked and the film is advanced through the length of one frame. According to the present invention, this switch S3 is utilized as part of a coordinating control circuit to initiate one cycle of energization of motor M at the termination of an exposure.

When the shutter release button 1a of FIG. 1 is depressed to close switch S2, transistor 72 is rendered able to conduct, thus applying a voltage to the gate of thyristor 73. At this time, when switch S3 is set in its "a" position where the camera shutter is in the cocked position, the negative but is connected to the negative terminal of battery B'. In a very short time period after the depression of the shutter release button 1a, the output voltage of a timing circuit of a fixed resistor 75 and a capacitor 76 reaches a critical voltage level for conduction of a switching transistor 77, causing energization of a camera release electromagnet 78. Thus a reflux mirror moves upward, and the memory switch 60 is opened. At the completion of adjustment of diaphragm aperture in accordance with the object brightness level, the sensitivity of the film and the preselected shutter speed, the shutter is opened to close the start switch 68. At the terminal of the time interval corresponding to the preselected shutter speed, shutter electromagnet 70 is energized to terminate the exposure. As the rear shutter curtain runs down, switch S3 is set from "a" position to "b" position.

Referring now to FIG. 6, an example is shown of the electrical circuitry established in the combination of camera 1 and motor drive unit 2 through a pair of electrical interconnection channels P3–P4 and P5–P6 and through a mechanical linkage between motor M and switch S3, whereby switch S3 is incorporated into a coordinating control circuit.

The coordinating control circuit includes a relay RL1 associated with a power supply control switch S4 for motor M and a switching circuit for the relay RL1. The switching circuit is composed of a pnp-type transistor Tr3 connected in series with the winding of relay RL1 between the positive and negative buses, and a npn-type transistor Tr2 having a collector electrode connected to the base electrode of transistor Tr3 through a resistor R6 and to the positive bus through a resistor R5. The circuit also include a npn type transistor Tr1 with a collector electrode, connected to the base electrode of transistor Tr2 and to the positive bus through a resistor R4, and a base electrode connected through series-connected resistor R3, diode D4 and a resistor R1 to the interconnection terminal P4. Both of the emitter electrodes of transistors Tr1 and Tr2 are connected to terminal P4. Connected across the winding of relay RL1 is a smooth circuit comprising a capacitor C2 and a resistor R8 connected in series with each other to prevent the chattering of relay RL1. The coordinating control circuit is provided with a timing circuit composed of a resistor R2 and a capacitor C1 and having a time constant corresponding to a time interval slightly longer than that necessary for motor M to advance the film through the length of one frame. The coordinating control circuit is also provided with a display circuit including the indicator D1 of FIGS. 1 to 4 in the form of a light emitting diode, so that the operator is immediately aware if no more fresh film area for a further exposure is available. The display circuit is composed of light-emitting diode D1 of which the critical voltage level for light emission is about 1.4 volts, and having an anode connected to the emitter electrode of transistor Tr3, a second diode D2 connected in series to diode D1, and a third diode D3 of a voltage drop of about 0.6 volt connected between second diode D2 and the collector electrode of transistor Tr3 so that the light emitting diode D1 is rendered effective only when switch S3 remains in "b" position and transistor Tr3 is in the conducting state.

The winding of motor M is connected at one end to the negative terminal of battery B in battery holder 4, the opposite end of which is connected to the movable contact of switch S4. Switch S4 has two fixed contacts of which contact "b" is connected to the positive bus and through the main switch S1 of FIGS. 1 to 4 to the positive terminal of battery B, and another contact "a" which is connected through a diode D5 to the negative terminal of battery B. This diode D5 functions to minimize the tendency of motor M and reduction gear train to travel past the end of a film-advancing stroke and also to permit reverse rotation of motor M and the gear train without exerting any locking force, as the residual tendency of the nature described above though first to cause excess rotation of the winding shaft 33 (FIG. 5) with increasing amount of over load on the coupler 21 of a take-up spool is absorbed by the relaxed motor and gear train. Connected across the winding of motor M is a capacitor C3.

Figure 8:
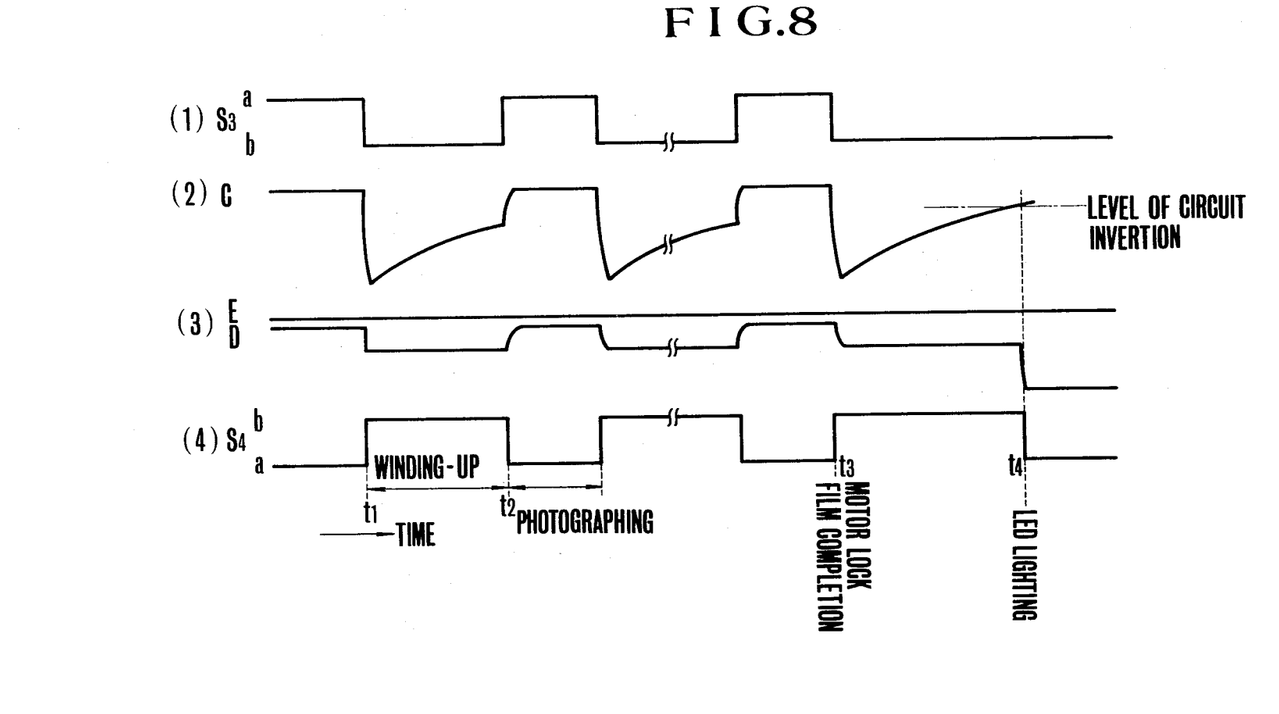
FIG. 8 is a timing chart showing the manner in which the present motor drive unit with the camera may be used.

The operation of the motor drive unit 2 with camera 1 is described by reference to the timing chart of FIG. 8. Camera 1 is assumed to be in the cocked position where switch S3 is set in "a" position as shown in FIGS. 6 and 7. When the shutter release button 1a of camera 1 is depressed to close switch S2, the timing circuit 75, 76 for switching transistor 77 of camera release electromagnet 78 is actuated. In a time interval dependent upon the time constant of circuit 75, 76 during which the light-response of the sensor circuit 51 is normalized, the camera release initiates, an exposure. When the exposure has been completed at a time t1 as shown on line 4 of FIG. 8, switch S3 is set from "a" position to "b" position as shown on line 1. Thus the potential of a point C, i.e., the output of timing circuit R2 and C1, is suddenly dropped to a level almost equal to that of the negative terminal of battery B as shown on line 2 of FIG. 8. Thus transistor Tr3 conducts to energize relay RL1 as a base current flows through transistor Tr3, resistor R6, conducted transistor Tr2 and resistor R7 to the negative bus. When relay RL1 is energized a power supply circuit is established for motor M from battery B through closed switch S1, as switch S4 is set from "a" position to "b" position. If fresh film areas for further exposures are available, one cycle of the film advancing operation is completed in a time interval shorter than that corresponding to the time constant of timing circuit R2 and C1. When the motor driven film advancing operation has been completed at a time t2 as shown on line 4 of FIG. 8, switch S3 is set from "b" position to "a" position. Thus transistor Tr3 is rendered non-conducting. Relay RL1 is deenergized, and switch S4 is returned to "a" position where diode D5 is rendered effective to exert a locking action on motor M. So long as the shutter release button 1a is depressed, such procedure repeats itself for a successive set of exposures.

Now assuming that after the n-th frame exposure is completed at a time $t_n$, there is no more fresh film area, motor M is locked by the tensioned film to maintain switch S3 set in "b" position until a time interval corresponding to the time constant of timing circuit R2 and C1 has passed at a time $t_{n+1}$. At this time, transistor Tr1 is rendered able to conduct by the output of timing circuit R2 and C1, and transistor Tr3 is rendered unable to conduct, thus deenergizing motor M. The coincidental occurrence of switch S3 set in "b" position and the non-conduction of transistor Tr3 results in energization of light-emitting diode D1, as the potential of point D is dropped relative to that of point E as shown on line 3 of FIG. 8. The potential difference is increased across light-emitting diode D1 to a level larger than about 1.4 volts from a level equal to the sum of a voltage drop due to diode D3 by about 0.6 volt and a voltage drop due to transistor Tr3 by about 0.1 volt; that is, about 0.7 volt.

From the foregoing, it will be appreciated that the present invention provides a motor drive unit for use with a camera which operates to coordinate the shutter and film winding mechanism without using an actuator in addition to the shutter release button provided in the camera. This feature of the invention facilitates minimization of the bulk and weight of the motor drive unit and assists in handling the camera with the motor drive unit in any photographing position. The motor drive unit of the invention provides a space for accommodating batteries and is designed to effect optimum arrangement of the various constitutional parts at desired locations independently of each other, thereby giving an advantage of manufacturing a production run of motor drive units economically while holding all of the design parameters within specific tolerances. This also makes it easier to repair the broken unit. Another advantage is that the time necessary to exchange the old battery with new one can be reduced, and this advantage becomes more effective particularly when using the motor drive unit in cold places where the rate of consumption of batteries is relatively high. Still another advantage is that the dust-shielding cover can be prevented from missing by only one trough. A further advantage derived from the provision of a timing circuit made in the coordinating control circuit is that one cycle of energization of the motor is limited to a predetermined time period to prevent the locking of the motor by the tensioned film for a longer time period to increase the life time of the motor. This leads to an increase of the reliability of operation of the motor drive unit. Further, the exposure number indicator can be utilized to check the voltage of the battery.

What is claimed is:

1. A motor drive unit for a camera, said camera having exposure control means with an actuator controlling actuation of said exposure control means, which unit comprises:
    (a) a film winding-up member,
    (b) driving means for driving said winding-up member for rotation,
    (c) motion transmitting means positioned between said film winding-up member and said driving means for transmitting motion of said driving means to said film winding-up member,
    (d) power supply means for said driving means, and
    (e) control means for coordinating said exposure control means and said power supply means, said control means having changeover means operable with said driving means and arranged in said camera to be effective at the termination of operation of said exposure control means to actuate said power supply means, and effective at the termination of one cycle of film winding-up operation to actuate said exposure control means so long as said actuator is operated, said camera being provided with a dust-shielding cover removeably mounted in a recessed portion thereof, said motor drive unit further including means for accommodating said dust-shielding cover when it is taken out of the recessed portion of said camera.

2. A motor drive unit according to claim 1 wherein said coordinating control means includes a timing circuit and a switching circuit both of which are rendered effective when said changeover means is set to initiate one cycle of film winding-up operation, and further includes display means energized only when the energization of said driving means by turning said switching circuit on is followed by turning said switching circuit off when said changeover means is prevented from moving from the film wind-up position, whereby the operator is aware that no more fresh film area is available for a further exposure.

3. A motor drive unit for a camera having a film winding member and a dust-shielding cover for the winding member, comprising:
    a body provided with a camera attaching surface;
    a recess formed in said body for housing therein the dust-shielding cover,
    said recess being adapted to accommodate therein said dust-shielding cover of the film winding member after the cover is detached from the camera;
    a setting screw,
    said setting screw being adapted to mount said body onto the camera when said body is attached to the camera; and
    winding motor means couplable to the winding member when the unit is attached to the camera,
    a control circuit coupled to said winding motor,
    said circuit being adapted to drive said motor means after the exposure of the camera has been completed to effect a winding operation in the camera.

4. A motor drive unit for a camera having a film winding member and a dust-shielding cover for the winding member, comprising:
    a body provided with a camera attaching surface;
    a recess formed in said body for housing therein the dust-shielding cover, said recess being adapted to accommodate therein said dust-shielding cover of the film winding member after the cover is detached from the camera;

a setting screw, said setting screw being adapted to mount said body onto the camera when said body is attached to the camera; and winding motor means couplable to the winding member when the unit is attached to the camera, a control circuit coupled to said winding motor, said circuit being adapted to drive said motor means after the exposure of the camera has been completed to effect a winding operation in the camera;

a battery casing detachably mounted on the rear portion of said body said casing being capable of accommodating therein battery means for supplying electric power to said control circuit.

5. A unit according to claim 4, wherein a rear portion of said body includes a mounting surface having a first engaging portion at one end thereof and a second engaging portion at the other end, a guide surface between said one end and said other end, said battery casing having a mounting surface with a first engaging portion, a second engaging portion and a guide surface.

6. A unit according to claim 3, wherein said motor means includes a winding motor, a winding shaft couplable to the film winding member when the unit is mounted on the camera, and a transmitting mechanism arranged intermediate said winding motor and said winding-up shaft, said transmitting mechanism being supported by said winding motor in a plane along one planar section, said control circuit being arranged along another planar section opposing said transmitting mechanism.

7. For attachment to a camera having a film winding member with a dust-shielding cover, and forming an exposure completion signal, a motor drive unit comprising:

a body with a camera attaching surface;

a portion formed in said body at said attaching surface for housing therein a dust-shielding cover, said portion being adapted to accommodate therein said dust-shielding cover of the winding member after the unit is detached from the camera;

a winding motor;

a winding shaft driven by said motor, said winding shaft protruding from said camera attaching surface and being adapted to be inserted into the camera and coupled to the winding member when said body is attached to the camera;

a mounting screw, said mounting screw being adapted to secure said body onto the camera when said body is attached to the camera;

a circuit coupled to the winding motor for controlling the winding motor; and terminal means adapted to receive the exposure completion signal from the camera, said terminal means being coupled to the control circuit for applying said exposure completion signal to said control circuit so as to drive said motor.

8. A camera and motor drive unit assembly comprising:

a camera body provided with a first mounting surface, said camera body including:

exposure means, film winding means having a winding coupler on said mounting surface, signal means for generating an exposure completion signal, a dust-shielding cover detachably mounted on said mounting surface, said cover being adapted to cover said winding coupler, first terminal means provided on said mounting surface, said first terminal means being adapted to receive the exposure completion signal, and a threaded opening provided on said mounting surface;

motor drive means including:

a second mounting surface corresponding to said mounting surface of said camera body, and receiving means formed at said second mounting surface for accommodating therein a dust-shielding cover, said receiving means receiving said dust-shielding cover when said drive motor means is attached to said camera body with said dust-shielding cover detached from said mounting surface of said camera body;

said drive means having a winding motor;

said drive means having a winding shaft driven by said motor;

said drive means having said winding shaft protruding from said second mounting surface to engage said winding coupler when said drive motor means is attached to said camera body;

said drive means having a mounting screw, said screw being engaged with said threaded opening when said drive motor means is attached to said camera so as to effect connection of said camera and said drive motor means;

said drive means having a control circuit for controlling the drive of said winding motor; and said drive means having second terminal means coupled to said control circuit and adapted to contact said terminal means at the camera body when said drive means is attached to said camera body, said second terminal means receiving an exposure completion signal from said first terminal means so as to apply said signal to said control circuit and effect driving of said motor.

* * * * *